US008854004B2

(12) United States Patent
Lee

(10) Patent No.: US 8,854,004 B2
(45) Date of Patent: Oct. 7, 2014

(54) ENERGY STORAGE SYSTEM AND CONTROLLING METHOD THEREOF

(75) Inventor: Sung-Im Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 724 days.

(21) Appl. No.: 13/095,814

(22) Filed: Apr. 27, 2011

(65) Prior Publication Data
US 2012/0176088 A1 Jul. 12, 2012

Related U.S. Application Data

(60) Provisional application No. 61/432,127, filed on Jan. 12, 2011.

(51) Int. Cl.
H02J 7/00 (2006.01)
H02J 7/34 (2006.01)
H02J 3/38 (2006.01)
H02J 3/32 (2006.01)
H02J 9/06 (2006.01)

(52) U.S. Cl.
CPC ............... *H02J 3/383* (2013.01); *Y02E 10/566* (2013.01); *H02J 7/34* (2013.01); *H02J 3/382* (2013.01); *Y02E 10/58* (2013.01); *H02J 3/32* (2013.01); *H02J 3/386* (2013.01); *H02J 3/385* (2013.01); *H02J 9/062* (2013.01); *Y02E 10/763* (2013.01); *Y02E 10/563* (2013.01)
USPC ............................ 320/128; 320/101; 363/147

(58) Field of Classification Search
CPC ...................................................... H02J 7/0068
USPC ........... 320/128, 101; 363/147, 142; 323/125, 323/332
See application file for complete search history.

(56) References Cited

U.S. PATENT DOCUMENTS

| 5,659,237 | A | * | 8/1997 | Divan et al. | 320/119 |
|---|---|---|---|---|---|
| 5,666,041 | A | * | 9/1997 | Stuart et al. | 320/116 |
| 6,133,707 | A | * | 10/2000 | Kikuchi et al. | 320/104 |
| 6,314,007 | B2 | * | 11/2001 | Johnson et al. | 363/37 |
| 6,873,134 | B2 | * | 3/2005 | Canter et al. | 320/118 |
| 2003/0047209 | A1 | | 3/2003 | Yanai et al. | |
| 2004/0178768 | A1 | * | 9/2004 | Miyazaki et al. | 320/116 |
| 2008/0258554 | A1 | | 10/2008 | Wang et al. | |

FOREIGN PATENT DOCUMENTS

| JP | 2010-080549 A | 4/2010 | |
|---|---|---|---|
| KR | 2008-0065818 A | 7/2008 | |
| KR | 10-0902507 B | 6/2009 | |
| KR | 10-2010-0092261 A | 8/2010 | |
| WO | WO 2009/155445 | * 12/2009 | H03C 3/09 |
| WO | WO 2009/155445 A2 | 12/2009 | |

OTHER PUBLICATIONS

European Search Report dated Aug. 20, 2012, for corresponding European Patent application 11167832.2, (5 pages).
Machine Translation of JP2010-080549 A, 25 pgs.

* cited by examiner

Primary Examiner — Yalkew Fantu
(74) Attorney, Agent, or Firm — Christie, Parker & Hale, LLP

(57) ABSTRACT

An energy storage system and a controlling method thereof are provided. Accordingly, an operation mode of the energy storage system is stably changed. The energy storage system includes: a battery; an inverter for receiving a first power from an external source and generating a second power; and a converter coupled between the battery and both the external source and the inverter. The converter is configured to enter an off mode between a charge mode for charging the battery and a discharge mode for discharging the battery.

23 Claims, 13 Drawing Sheets

ENERGY STORAGE SYSTEM AND CONTROLLING METHOD THEREOF

CROSS-REFERENCE TO RELATED APPLICATION

This application claims priority to and the benefit of U.S. Provisional Patent Application No. 61/432,127, filed on Jan. 12, 2011, the entire content of which is incorporated herein by reference.

BACKGROUND

1. Field

Aspects of one or more embodiments according to the present invention relate to an energy storage system and a controlling method thereof.

2. Description of Related Art

As environmental destruction, resource depletion, etc., become serious problems, interest in a system capable of storing energy and efficiently using the stored energy has been increased. In addition, interest in renewable energy, which does not generate pollution or generates little pollution in a development process, has been increased. An energy storage system that interconnects an existing grid, a renewable energy source, and a battery system that stores power has been researched and developed to cope with today's environmental changes. The energy storage system has various operation modes according to conditions of the renewable energy source, the battery system, the grid, and a load, so that transitions among the operation modes should be stably performed.

SUMMARY

One or more embodiments of the present invention are directed toward an energy storage system capable of stably changing an operation mode and a controlling method thereof.

According to one or more embodiments of the present invention, frequent operation mode changes of an energy storage system may be reduced and the lifespan of a battery and a converter can be improved.

According to an embodiment of the present invention, an energy storage system includes a battery; an inverter for receiving a first power from an external source and generating a second power; and a converter coupled between the battery and both the external source and the inverter. The converter is configured to enter an off mode between a charge mode for charging the battery and a discharge mode for discharging the battery.

The converter may be configured to enter the off mode for a set period of time when a difference between a value of the first power and a value of the second power changes polarity.

When the converter is in the off mode, the converter may be configured to remain in the off mode for the set period of time regardless of variation of the difference between the value of the first power and the value of the second power.

The converter may be configured to operate in the discharge mode or the charge mode according to the difference between the value of the first power and the value of the second power, after the set period of time has elapsed.

The converter may be configured to operate in the charge mode to charge the battery when the value of the first power is greater than the value of the second power, and to operate in the discharge mode to discharge the battery when the value of the first power is less than the value of the second power.

The second power may vary in accordance with an amount of power consumed by a load coupled to the inverter.

The converter may be configured to enter the off mode when a value of the first power is between a first threshold value and a second threshold value that is lower than the first threshold value.

A value of the second power may be between the first threshold value and the second threshold value.

The first threshold value and the second threshold value may change by a same amount as the value of the second power.

When the converter is in the off mode, the converter may be configured to remain in the off mode when variation of the value of the first power is between the first threshold value and the second threshold value.

When the converter is in the off mode, the converter may be configured to exit the off mode when the value of the first power is above the first threshold value or below the second threshold value.

After the converter exits the off mode, the converter may be configured to operate in the discharge mode or the charge mode according to the value of the first power and the first and second threshold values.

The converter may be configured to operate in the charge mode to charge the battery when the value of the first power is greater than the first threshold value, and to operate in the discharge mode to discharge the battery when the value of the first power is less than the second threshold value.

At least one of the first threshold value or the second threshold value may be between an upper hysteresis value and a lower hysteresis value, and the converter may be configured to remain in the off mode while a variation of the value of the first power is between the upper hysteresis value and the lower hysteresis value.

According to an embodiment of the present invention, a method is provided to operate an energy storage system including a converter coupled between a battery and both an external source and an inverter. The method includes converting a first power from the external source to a second power by the inverter and operating the converter to enter an off mode between a charge mode for charging the battery and a discharge mode for discharging the battery.

The method may further include: discharging the battery by the converter when a value of the first power is less than a value of the second power and charging the battery by the converter when the value of the first power is greater than the value of the second power; and operating the converter to enter the off mode for a set period of time when a difference between the value of the first power and the value of the second power changes polarity.

The method may further include: when the converter is in the off mode, maintaining the converter in the off mode regardless of variation of the difference between the value of the first power and the value of the second power.

The method may further include: after the set period of time has elapsed, operating the converter in the discharge mode or the charge mode according to the difference between the value of the first power and the value of the second power.

The second power may vary in accordance with an amount of power consumed by a load coupled to the inverter.

The method may further include: discharging the battery by the converter when a value of the first power is less than a value of the second power and charging the battery by the converter when the value of the first power is greater than the value of the second power; and operating the converter to enter the off mode when the value of the first power is between a first threshold value and a second threshold value that is lower than the first threshold value.

The first threshold value and the second threshold value may change by a same amount as the value of the second power.

The method may further include: when the converter is in the off mode, maintaining the converter in the off mode when variation of the value of the first power is between the first threshold value and the second threshold value.

The method may further include: when the converter is in the off mode, operating the converter to exit the off mode when the value of the first power is above the first threshold value or when the value of the first power is below the second threshold value.

The method may further include: after the converter exits the off mode, operating the converter in the discharge mode or the charge mode according to the value of the first power and the first and second threshold values.

At least one of the first threshold value or the second threshold value may be between an upper hysteresis value and a lower hysteresis value, and the method may further include: maintaining the converter in the off mode while variation of the value of the first power is between the upper hysteresis value and the lower hysteresis value.

DETAILED DESCRIPTION OF THE EMBODIMENTS

Figure 1:
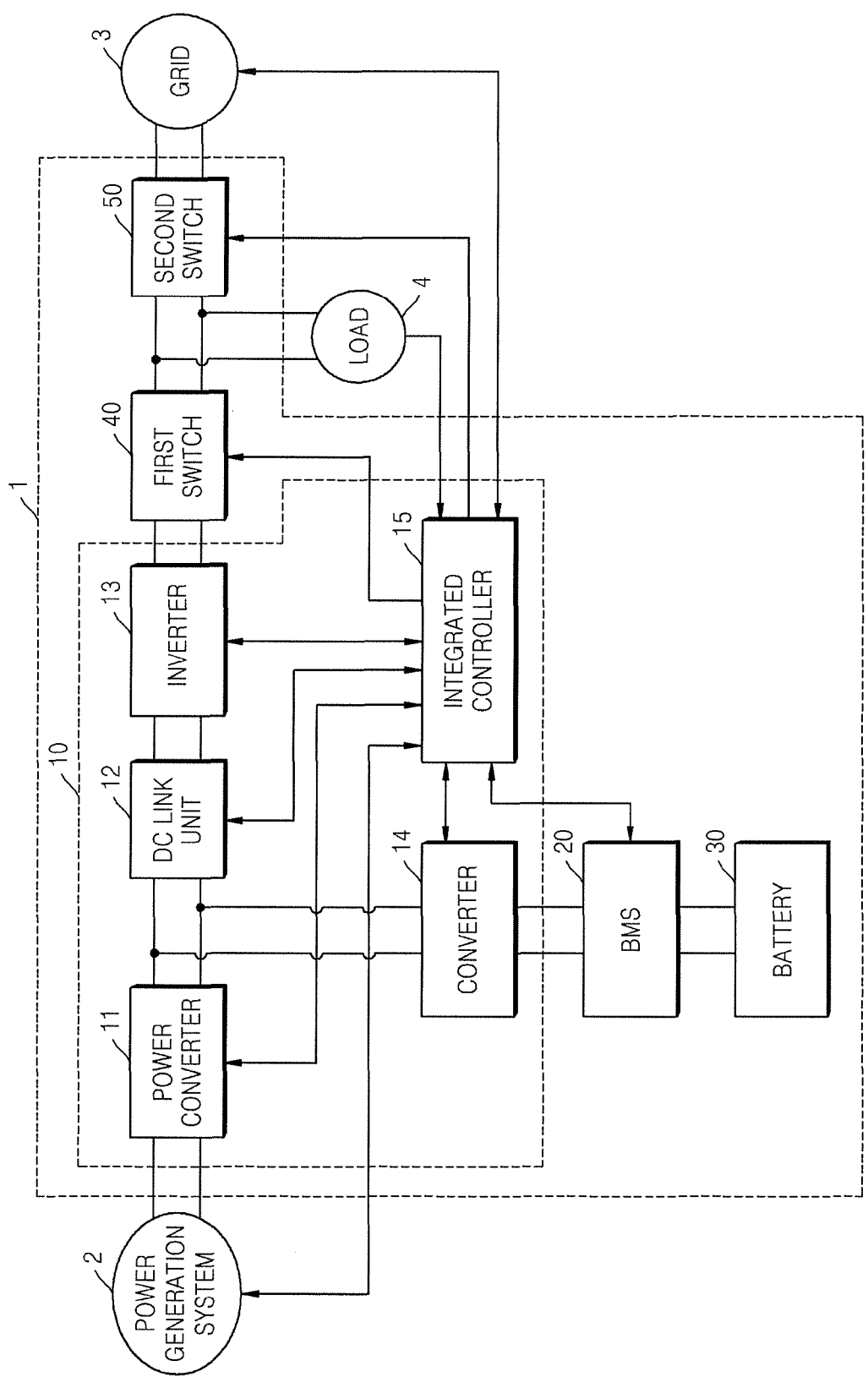
FIG. 1 is a block diagram illustrating a structure of an energy storage system according to an embodiment of the present invention.

While exemplary embodiments of the present invention are capable of various modifications and alternative forms, embodiments thereof are shown by way of example in the drawings and will herein be described in detail. It should be understood, however, that there is no intent to limit exemplary embodiments to the forms disclosed, but on the contrary, exemplary embodiments are to cover all modifications, equivalents, and alternatives falling within the scope of the present invention.

Hereinafter, exemplary embodiments of the present invention will now be described more fully with reference to the accompanying drawings, in which exemplary embodiments of the present invention are shown. Like or corresponding reference numerals in the drawings denote like elements, and thus their descriptions will be omitted.

FIG. 1 is a block diagram illustrating a structure of an energy storage system 1 according to an embodiment of the present invention.

Referring to FIG. 1, the energy storage system 1 is coupled to a power generation system 2 and a grid 3 to supply power to a load 4.

The power generation system 2 generates power using an energy source. The power generation system 2 supplies the generated power to the energy storage system 1. The power generation system 2 may be a photovoltaic power generation system, a wind power generation system, a tidal power generation system, or the like. However, this is an exemplary embodiment, and thus the power generation system 2 is not limited to the above-mentioned types. The power generation system 2 may include all suitable types of power generation systems that generate power using renewable energy such as solar heat, geothermal heat, or the like. In particular, since a solar cell generates electric energy using sunlight and is easily installed in a home, a factory, or the like, the solar cell is appropriate to be applied to the energy storage system 1 distributed in a home, a factory, or the like. The power generation system 2 may include a plurality of power generation modules arrayed in parallel and generates power via each of the power generation modules to constitute a mass storage energy system.

Here, the grid 3 is a generic term for a power plant, a substation, a power line, or the like. If the grid 3 is in a normal state, the grid 3 supplies power to the energy storage system 1 to supply power to the load 4 and/or a battery 30, and the grid 3 is supplied with power from the energy storage system 1. If the grid 3 is in an abnormal state, the grid 3 stops the supply of the power to and from the energy storage system 1.

The load 4 consumes power generated by the power generation system 2, power stored in the battery 30, or power supplied from the grid 3. An electric/electronic device or the like in a home or a factory may be an example of the load 4.

The energy storage system 1 stores power generated by the power generation system 2 in the battery 30 and supplies the generated power to the grid 3. The energy storage system 1 supplies power stored in the battery 30 to the grid 3 or stores power supplied from the grid 3 in the battery 30. If the grid 3 is in the abnormal state, e.g., a power failure occurs, the energy storage system 1 performs an uninterruptible power supply (UPS) operation to supply power to the load 4. Even if the grid 3 is in the normal state, the energy storage system 1 can supply the power generated by the power generation system 2 or the power stored in the battery 30 to the load 4.

The energy storage system 1 includes a power conversion system (PCS) 10 that controls power conversion, a battery management system (BMS) 20, the battery 30, a first switch 40, and a second switch 50.

The PCS 10 converts powers of the power generation system 2, the grid 3, and the battery 30 into appropriate power and supplies the power to a place (e.g., the load 4) that demands the power. The PCS 10 includes a power converter 11, a direct current (DC) link unit 12, a inverter 13, a converter 14, and an integrated controller 15.

The power converter 11 is a power conversion device coupled between the power generation system 2 and the DC link unit 12 (e.g., a DC linker). The power converter 11 transmits power generated by the power generation system 2 to the DC link unit 12. Here, the power converter 11 converts a power voltage into a DC link voltage.

The power converter 11 may be a power conversion circuit, such as a converter, a rectifier circuit, or the like, according to the type of the power generation system 2. If power generated by the power generation system 2 is a direct current (DC)

type, the power converter 11 may be a converter that converts the DC voltage into the DC link voltage. If the power generated by the power generation system 2 is an alternating current (AC) type, the power converter 11 may be a rectifier circuit that converts the AC voltage into the DC link voltage. If the power generation system 2 is a photovoltaic power generation system, the power converter 11 may include a maximum power point tracking (MPPT) converter that controls MPPT to maximize the power generated by the power generation system 2 according to changes in an insolation, a temperature, etc. When the power generation system 2 does not generate power, the power converter 11 stops its operation so that the converter, the rectifier circuit, or the like consumes a minimal amount of power.

A level of the DC link voltage may be unstable due to an instantaneous voltage drop in the power generation system 2 or the grid 3, a peak load occurring in the load 4, or the like. However, the DC link voltage is to be stabilized for normal operations of the converter 14 and the inverter 13. The DC link unit 12 is coupled between the power converter 11 and the inverter 13 to maintain the DC link voltage at a stable (e.g., uniform) voltage. A mass storage capacitor or the like may be used as the DC link unit 12.

The inverter 13 is a power conversion device coupled between the DC link unit 12 and the first switch 40. The inverter 13 may include an inverter that converts the DC link voltage output from the power generation system 2 and/or the battery 30 into an AC voltage of the grid 3 in a discharge mode and outputs the AC voltage. Here, the inverter 13 may be set to output a uniform or substantially uniform amount of power. The amount of power output from the inverter 13 may be uniformly maintained through controlling an operation of the converter 14, which will be described later in more detail. The inverter 13 may include a rectifier circuit that rectifies the AC voltage of the grid 3, converts the AC voltage into the DC link voltage, and outputs the DC link voltage to store power of the grid 3 in the battery 30 in a charge mode. The inverter may be a bidirectional inverter or may include plurality of inverting circuits.

The inverter 13 may further include a filter for removing a harmonic wave from an AC voltage output to the grid 3. The inverter 13 may further include a phase-locked loop (PLL) that synchronizes a phase of an AC voltage output from the inverter 13 with a phase of the AC voltage of the grid 3 to inhibit reactive power from being generated. The inverter 13 performs functions such as a voltage change range restriction function, a power-factor improvement function, a DC component removal function, a transient phenomena protection function, etc. When the inverter 13 is not used, the inverter 13 may stop its operation to reduce power consumption.

The converter 14 is a power conversion device coupled between the DC link unit 12 and the battery 30. The converter 14 includes a converter that converts a voltage of power stored in the battery 30 into a voltage level demanded by the inverter 13, i.e., into the DC link voltage, in the discharge mode. That is, the converter 14 performs DC-DC conversion with respect to the power, and outputs the DC link voltage. The converter 14 includes a converter that converts a voltage of power output from the power converter 11 or a voltage of power output from the inverter 13 into a voltage level demanded by the battery 30, i.e., into a charge voltage, in the charge mode. That is, the converter 14 performs DC-DC conversion with respect to the power, and outputs the charge voltage. If charging or discharging of the battery 30 is not performed, the converter 14 stops its operation to lower power consumption. The inverter may be a bidirectional inverter or may include plurality of inverting circuits.

The converter 14 changes its operation mode between the charge mode and the discharge mode according to an amount of power generated by the power generation system 2, an amount of power consumed by the load 4, an amount of power supplied from the grid 3, or an amount of power delivered to the grid 3. A detailed mode change operation of the converter 14 will be described below with reference to FIGS. 2 through 18.

The integrated controller 15 monitors states of the power generation system 2, the grid 3, the battery 30, and the load 4 and controls operations of the power converter 11, the inverter 13, the converter 14, the BMS 20, the first switch 40, and the second switch 50 according to monitoring results. The integrated controller 15 monitors whether or not a power failure has occurred in the grid 3, whether or not power has been generated by the power generation system 2, an amount of generated power if it is determined that the power generation system 2 has generated power, a charge state of the BMS 20, an amount of power consumed by the load 4, time, etc. When a power failure occurs in the grid 3 or power to be supplied to the load 4 is not sufficient, the integrated controller 15 determines priorities of power consuming devices included in the load 4 and controls the load 4 to supply power to the power consuming device having the highest priority.

The BMS 20 is coupled to the battery 30 and controls charge and discharge operations of the battery 30 under control of the integrated controller 15. The BMS 20 performs an overcharge protection function, an overdischarge protection function, an overcurrent protection function, an overvoltage protection function, an overheat protection function, a cell balancing function, etc. For this, the BMS 20 monitors a voltage, a current, a temperature, a residual amount of power, a lifespan, a charge state, etc. of the battery 30 and transmits monitoring results to the integrated controller 15.

The battery 30 is supplied with power generated by the power generation system 2 or power of the grid 3, stores the power, and supplies the stored power to the load 4 or the grid 3.

The battery 30 may include at least one or more battery racks coupled in series and/or in parallel as subunits. Each of the battery racks may include at least one or more battery trays coupled in series and/or in parallel as subunits. Each of the battery trays may include a plurality of battery cells. The battery 30 may be realized as various types of battery cells, e.g., a nickel-cadmium battery, a lead storage battery, a nickel metal hydride (NiMH) battery, a lithium ion battery, a lithium polymer battery, or the like. The number of battery racks of the battery 30 is determined according to a power capacity, design conditions, etc. demanded by the energy storage system 1. For example, if power consumption of the load 4 is large, the battery 30 may be constituted to include a plurality of battery racks. If power consumption of the load 4 is small, the battery 30 may be constituted to include one battery rack.

If the battery 30 is formed of a plurality of layers, the BMS 20 may include a plurality of BMSs that are respectively and separately installed with respect to the layers. For example, if the battery 30 is formed in an order of a battery cell level, a battery tray level, a battery rack level, and a battery level as described above, the BMS 20 may include a plurality of tray BMSs that respectively control a plurality of battery trays, a plurality of rack BMSs that respectively control the plurality of tray BMSs, and a system BMS or a master BMS that controls the plurality of rack BMSs.

The first and second switches 40 and 50 are coupled in series between the inverter 13 and the grid 3 and perform on/off operations under control of the integrated controller 15 to control a flow of a current between the power generation system 2 and the grid 3. On/off states of the first and second switches 40 and 50 are determined according to states of the power generation system 2, the grid 3, and the battery 30.

In more detail, if power of the power generation system 2 and/or the battery 30 is supplied to the load 4 or power of the grid 3 is supplied to the battery 30, the first switch 40 is switched on. If the power of the power generation system 2 and/or the battery 30 is supplied to the grid 3 or the power of the grid 3 is supplied to the load 4 and/or the battery 30, the second switch 50 is switched on.

If a power failure occurs in the grid 3, the second switch 50 is switched off, and the first switch 40 is switched on. In other words, power of the power generation system 2 and/or the battery 30 is supplied to the load 4, and the power supplied to the load 4 is prevented from flowing into the grid 3. Therefore, the energy storage system 1 is operated to prevent a worker operating with electric power lines or the like of the grid 3 from being electrocuted by power supplied from the energy storage system 1.

Switching devices, such as relays or the like capable of enduring a high current, may be used as the first and second switches 40 and 50.

The operation of the converter 14 will now be described in more detail.

Figure 2:
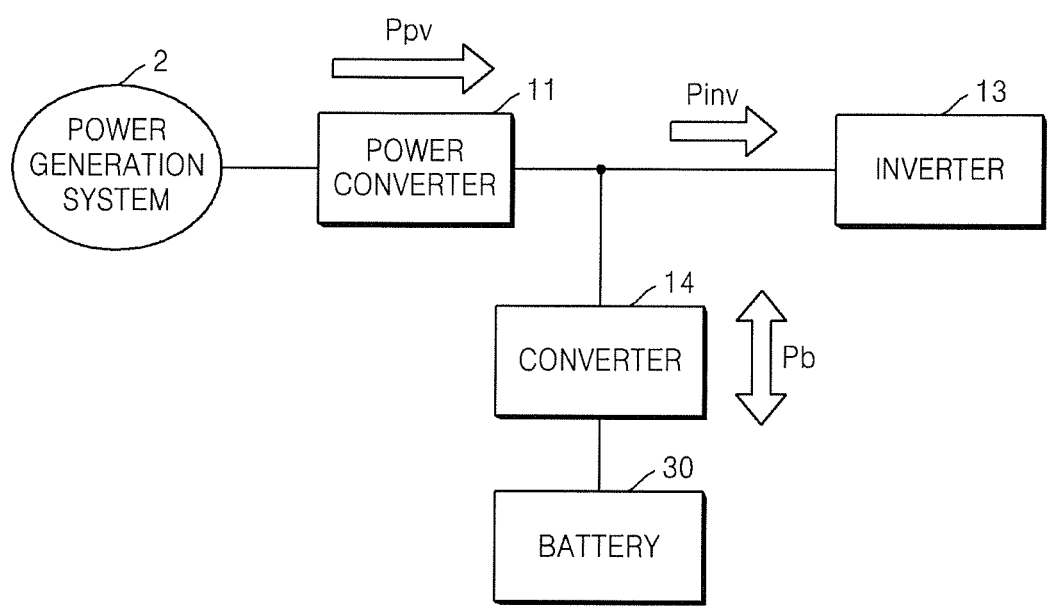
FIG. 2 is a block diagram illustrating an operation mode of an energy storage system according to an embodiment of the present invention.

FIG. 2 is a block diagram illustrating an operation mode of the energy storage system 1, according to an embodiment of the present invention.

Referring to FIG. 2, the inverter 13 of the energy storage system 1 outputs a fixed amount of power. Here, an amount of power consumed by the load 4, a state of the grid 3, etc. are not considered. The amount of power output from the inverter 13 is substantially equal to an amount of power input into the inverter 13, wherein the amounts of power are denoted by Pinv. An amount of power generated by the power generation system 2 is denoted by Ppv, and an amount of power output from or supplied to the converter 14 is denoted by Pb. If the converter 14 supplies power to the inverter 13, Pb has a positive value. If power is supplied to the converter 14 from the inverter 13, Pb has a negative value. A relation among the amounts of power will be as expressed in Equation 1 below:

$$Pinv = Ppv + Pb \quad (1)$$

wherein the value of Ppv is not constant but constantly varies. If Ppv is similar to Pinv, and Ppv alternates between being slightly increased and being slightly decreased, Pb varies between being a positive value and being a negative value. In other words, the converter 14 frequently changes its operation mode between the charge mode and the discharge mode. Also, the battery 30 frequently changes between being charged and being discharged. However, the frequent changes in the operation mode of the converter 14 shorten a lifespan of the converter 14 or make it more likely that a failure will occur in the converter 14. Also, the repetition of charge and discharge operations of the battery 30 has a harmful effect on a lifespan of the battery 30. In addition, the above-described operations make the energy storage system 1 less stable and thus are not appropriate for the energy storage system 1. Accordingly, in one embodiment of the present invention, the operation of the converter 14 is preset according to the amount of power generated by the power generation system 2 to solve the above-mentioned problems.

First Embodiment

Figure 3:
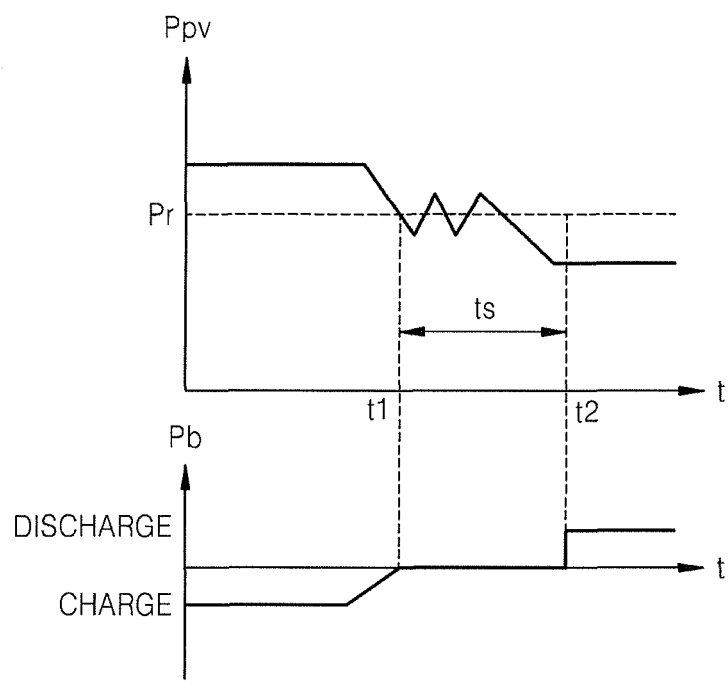
FIGS. 3 and 4 are graphs illustrating the operation mode of FIG. 2, according to an embodiment of the present invention.
Figure 4:
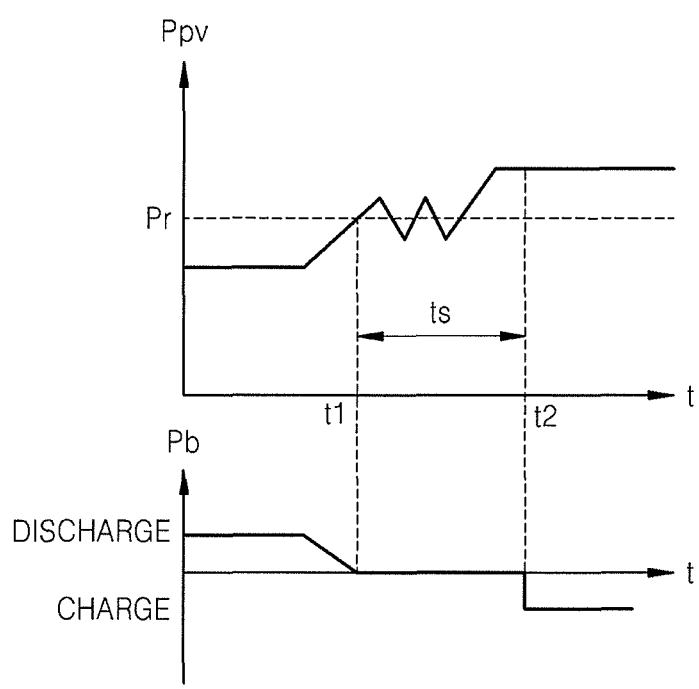

FIGS. 3 and 4 are graphs illustrating the operation mode of FIG. 2, according to an embodiment of the present invention. A determination of the operation mode of the converter 14 is set as follows.

<Set Operation-1>

An operation of the converter 14 stops (changes to an off state) for a preset time after an operation mode change threshold point of the converter 14 occurs.

Referring to FIG. 3, an upper graph illustrates an amount of power generated by the power generation system 2, and a lower graph illustrates an amount of power supplied into or supplied from the battery 30. A preset amount of power output from the inverter 13, i.e., rated power of the inverter 13, is set to Pr.

Ppv is higher than Pr before a first time t1, and this indicates that the power generation system 2 generates an amount of power larger than an amount of power demanded by the inverter 13. Therefore, power corresponding to a part of Ppv exceeding Pr is used to charge the battery 30.

Since Ppv falls under Pr at the first time t1 due to a decrease in the amount of power generated by the power generation system 2, the converter 14 stops its operation for a preset time ts. In other words, the converter 14 changes its operation mode from a charge mode to an off state. When the converter 14 is in the off state, the converter 14 does not change its operation mode in spite of variation in the value of Ppv.

After the preset time ts has elapsed, the converter 14 changes its operation mode to a discharge mode or the charge mode according to the value of Ppv. In FIG. 3, since Ppv remains lower than Pr after the preset time ts has elapsed, that is, at a second time t2, the converter 14 changes from the off state to the discharge mode.

Referring to FIG. 4, an upper graph illustrates an amount of power generated by the power generation system 2, and a lower graph illustrates an amount of power supplied into or supplied from the battery 30. A preset amount of power output from the inverter 13, i.e., rated power of the inverter 13, is set to Pr.

Ppv is lower than Pr before a first time t1, and this indicates that the power generation system 2 generates an amount of power less than an amount of power demanded by the inverter 13. Therefore, power corresponding to Pr−Ppv is discharged from the battery 30 to supplement Ppv.

Since Ppv rises above Pr at the first time t1 due to an increase in the amount of power generated by the power generation system 2, the converter 14 stops its operation for a preset time ts. In other words, the converter 14 changes from a discharge mode to an off state. When the converter 14 is in the off state, the converter 14 does not change its operation mode in spite of variation in the value of Ppv.

After the preset time ts has elapsed, the converter 14 changes its operation mode to the discharge mode or a charge mode according to the value of Ppv. In FIG. 4, since Ppv remains higher than Pr after the preset time ts has elapsed, that is, at a second time t2, the converter 14 changes from the off state to the charge mode.

FIGS. 5A-5C and 6A-6B illustrate simulation results of controlling the converter 14 using a general method, and FIGS. 7A-7C and 8A-8B illustrate simulation results of controlling the converter 14 using a method according to an embodiment of the present invention.

Figure 5A:
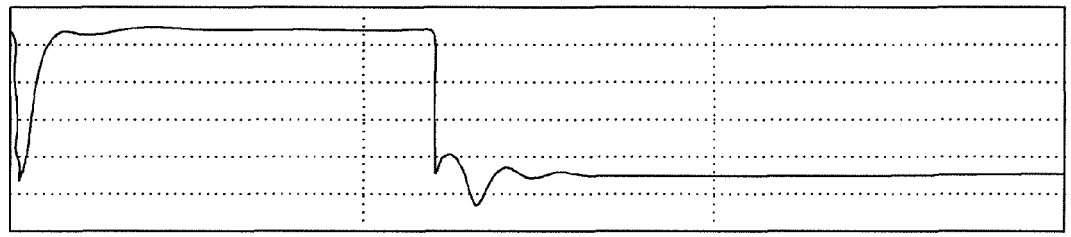
FIGS. 5A-5C, 6A-6B, 7A-7C, 8A-8B, 9A-9C through 10A-10C are views illustrating simulation results of the operation mode of FIG. 2.
Figure 5B:
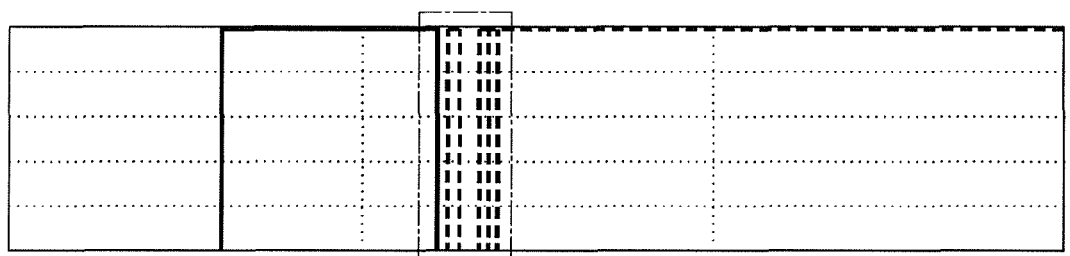
Figure 5C:
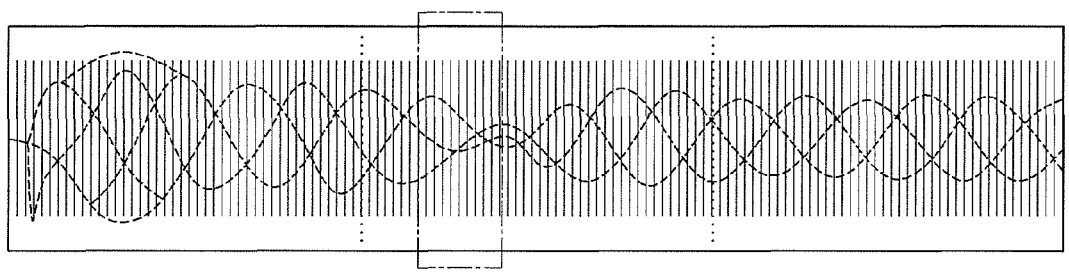

Referring to FIGS. 5A-5C, FIG. 5A illustrates an amount of power generated by the power generation system 2, FIG. 5B illustrates an operation of the converter 14, and FIG. 5C illustrates power of the inverter 13. A solid line in FIG. 5B indicates when the converter 14 operates in a charge mode, and dotted lines in FIG. 5B illustrate when the converter 14 operates in a discharge mode. FIGS. 5A-5C illustrate the simulation results of controlling the converter 14 using the general method when the amount of power generated by the power generation system 2 rapidly decreases.

In FIG. 5A, the amount of power generated by the power generation system 2 rapidly decreases. In FIG. 5B, corresponding to the decrease, an operation mode of the converter 14 frequently changes. In FIG. 5C, the power of the inverter 13 wobbles.

Figure 6A:
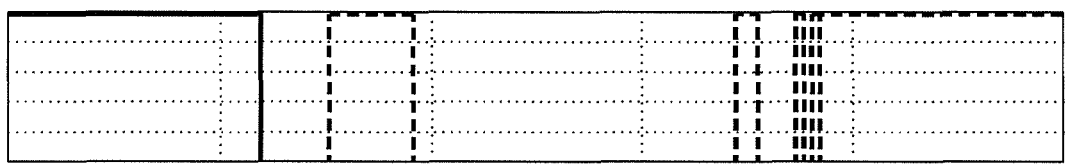
Figure 6B:
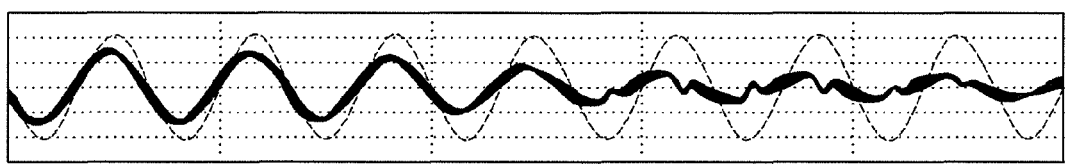

Referring to FIGS. 6A-6B, these graphs respectively correspond to enlarged parts of FIGS. 5B and 5C marked with boxes. In FIG. 6A, the operation mode of the converter 14 frequently changes among a charge mode, an off state, and a discharge mode. In FIG. 6B, the power of the inverter 13 is not constant but unstably varies.

Figure 7A:
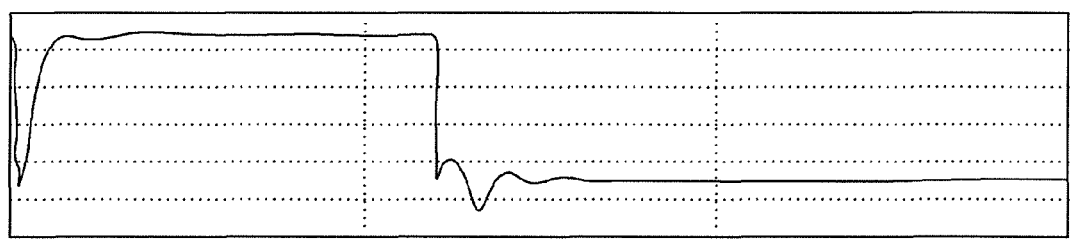
Figure 7B:
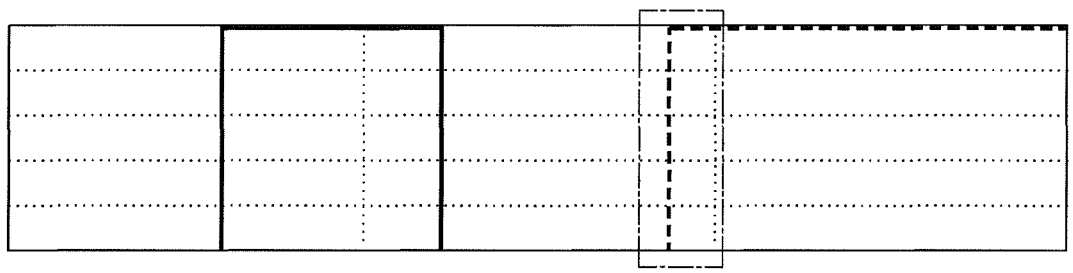
Figure 7C:
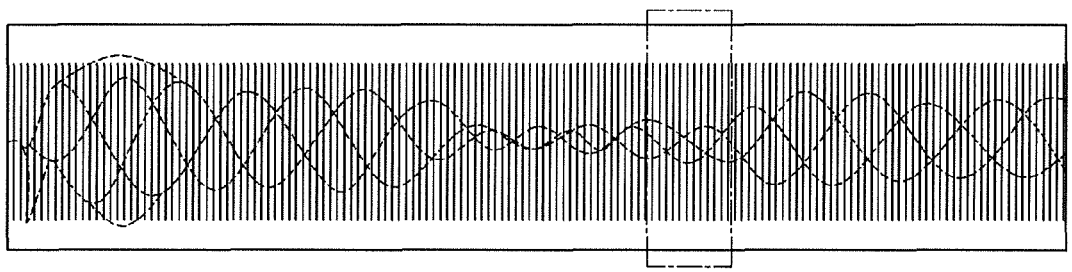

Referring to FIGS. 7A-7C, in FIG. 7A, when an amount of power generated by the power generation system 2 rapidly decreases, the converter 14 changes from a charge mode to an off state and maintains the off state for a preset time even when the amount of power generated by the power generation system 2 varies as shown in FIG. 7B. Also, after the preset time has elapsed, the amount of power generated by the power generation system 2 is detected to determine an operation mode. The converter 14 changes its operation mode to the determined operation mode. In one embodiment, after the preset time has elapsed, the decrease in the amount of power generated by the power generation system 2 is maintained, and thus the converter 14 changes from the off state to a discharge mode. In FIG. 7C, power of the inverter 13 is stable.

Figure 8A:
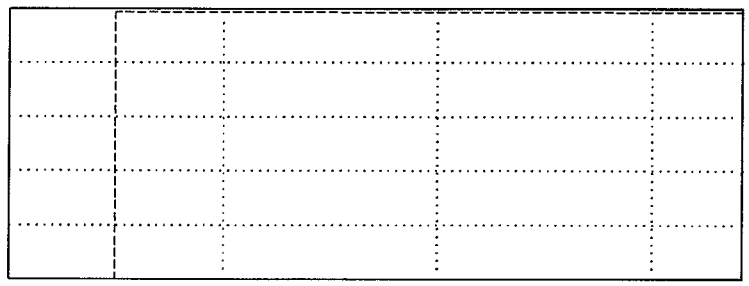
Figure 8B:
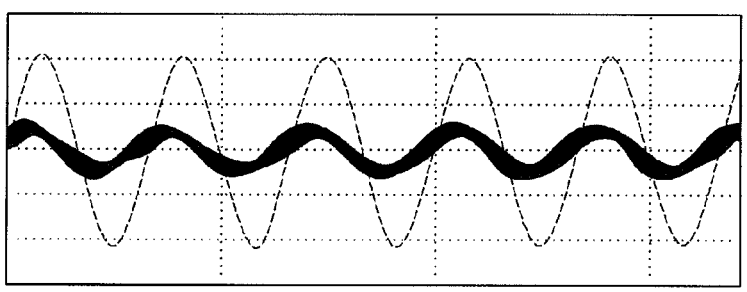

Referring to FIGS. 8A-8B, these figures respectively correspond to enlarged parts of FIGS. 7B and 7C marked with boxes. In FIG. 8A, the converter 14 maintains the off state and then changes to the discharge mode. Therefore, a change in the operation mode is performed only once and thus the power of the inverter 13 is stable.

Figure 9A:
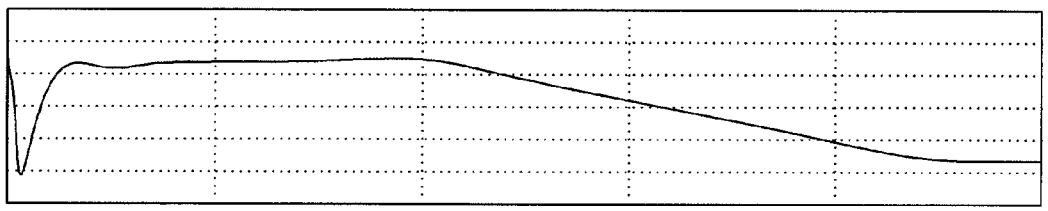
Figure 9B:
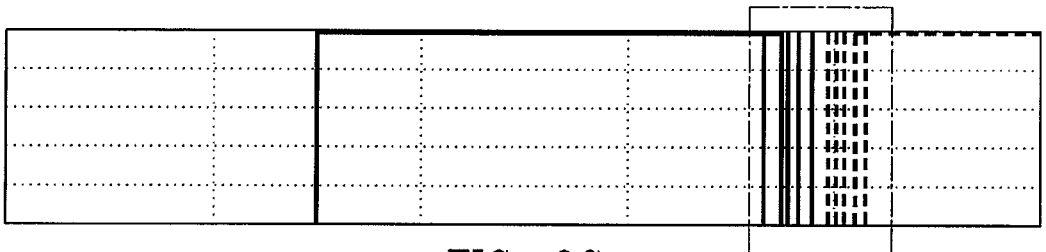
Figure 9C:
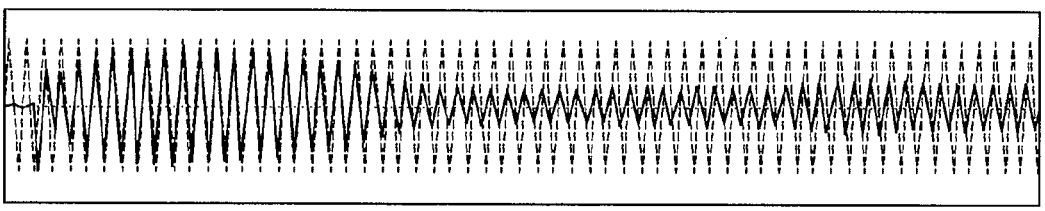
Figure 10A:
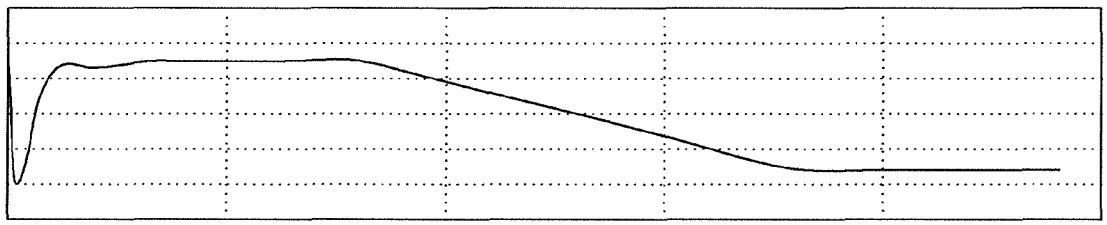
Figure 10B:
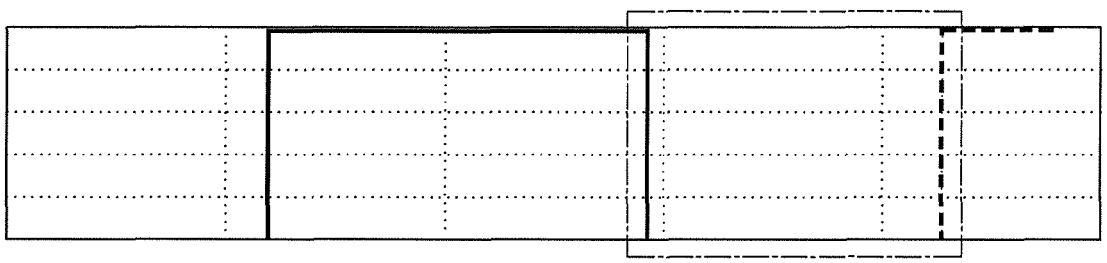
Figure 10C:
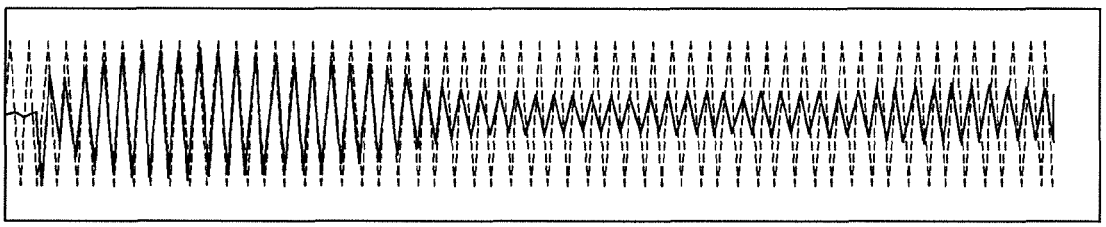

FIGS. 9A-9C illustrate other simulation results of controlling the converter 14 using a general method. FIGS. 10A-10C illustrate other simulation results of controlling the converter 14 using the method according to one embodiment of the present invention.

Referring to FIGS. 9A-9C, FIG. 9A illustrates an amount of power generated by the power generation system 2, FIG. 9B illustrates an operation of the converter 14, and FIG. 9C illustrates power of the inverter 13. A solid line in FIG. 9B indicates when the converter 14 operates in a charge mode, and dotted lines in FIG. 9B indicate when the converter 14 operates in a discharge mode. FIGS. 9A-9C illustrate the other simulation results of controlling the converter 14 using the general method when the amount of power generated by the power generation system 2 gradually decreases.

In FIG. 9A, the amount of power generated by the power generation system 2 gradually decreases. In FIG. 9B, corresponding to the decrease, the converter 14 frequently changes its operation mode between a charge mode and an off state with the decrease in the amount of power generated by the power generation system 2. Also, when the amount of power generated by the power generation system 2 further decreases, the converter 14 frequently changes its operation mode between the off state and a discharge mode. In FIG. 9C, the power of the inverter 13 wobbles.

Referring to FIGS. 10A-10C, in FIG. 10A, when an amount of power generated by the power generation system 2 gradually decreases, the converter 14 changes from the charge mode to the off state and maintains the off state for a preset time even when the amount of power generated by the power generation system 2 varies as shown FIG. 10B. After the preset time has elapsed, the amount of power generated by the power generation system 2 is detected to determine an operation mode, and the converter 14 changes its operation mode to the determined operation mode. In FIG. 10B, after the preset time has elapsed, since the amount of power generated by the power generation system 2 continuously decreases and falls under an amount of output power set in the inverter 13, the converter 14 changes from the off state to the discharge mode. In FIG. 10C, power of the inverter 13 is stable.

As described above, if an amount of power generated by the power generation system 2 slightly varies around Pr, that is, an operation mode change threshold value of the converter 14, and then reaches the threshold value, the converter 14 stops operating for a preset time ts. Therefore, the converter 14 is prevented from excessively changing its operation mode, a lifespan of the converter 14 increases, and failure occurrences of the converter 14 decrease. Stability of the energy storage system 1 including the converter 14 is secured.

Second Embodiment

Figure 11:
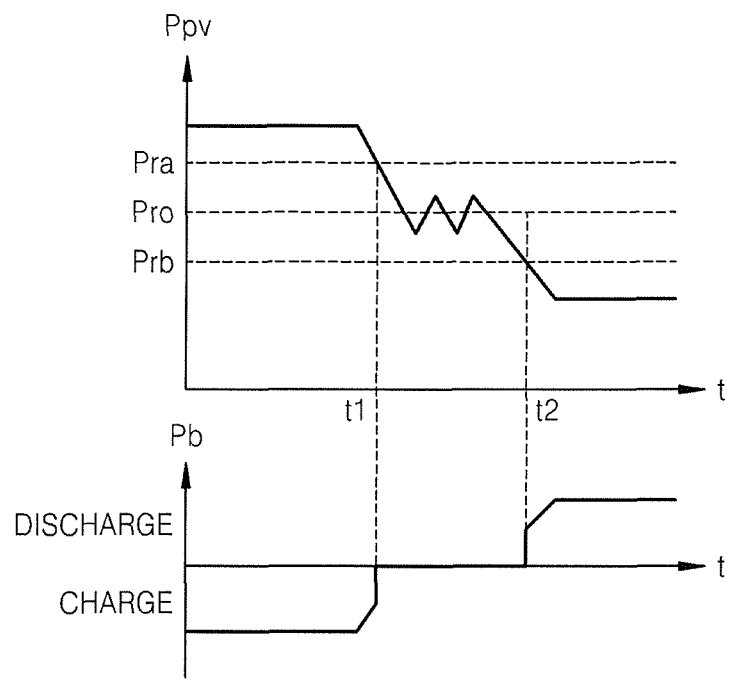
FIGS. 11 through 14 are graphs illustrating the operation modes of FIG. 2, according to other embodiments of the present invention.
Figure 12:
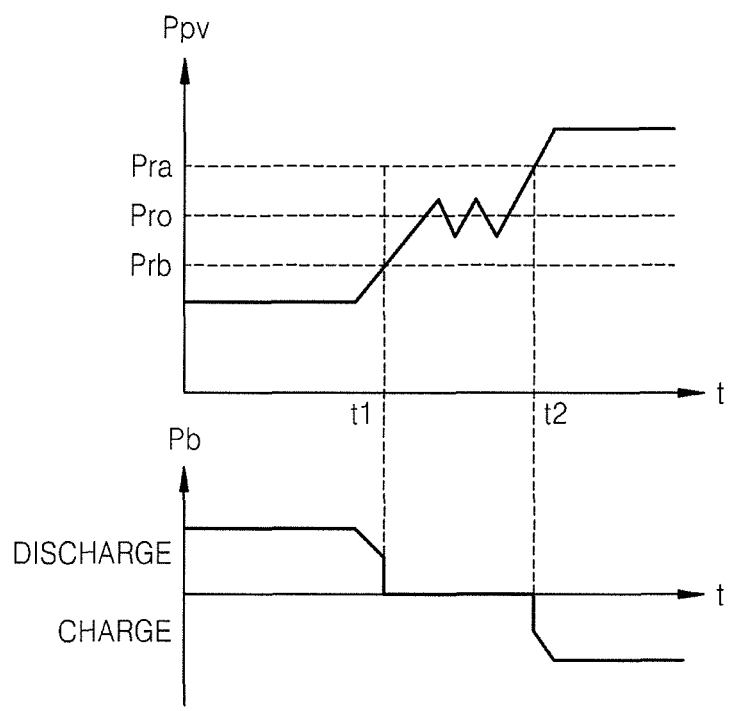

FIGS. 11 and 12 are graphs illustrating the operation mode of the converter 14 shown in FIG. 2, according to another embodiment of the present invention. A determination of the operation mode of the converter 14 is set as follows.

<Set Operation-2>

An off state section of the converter 14 is set.

Referring to FIG. 11, an upper graph illustrates an amount of power generated by the power generation system 2, and a lower graph illustrates an amount of power supplied into or supplied from the battery 30. A preset amount of power output from the inverter 13, i.e., rated power of the inverter 13, is set to Pro. An upper limit of an off state section in which the converter 14 is switched off is set to Pra, and a lower limit of the off state section is set to Prb. Ppv is higher than Pra before a first time t1, and this indicates that the power generation system 2 generates an amount of power larger than an amount of power demanded by the inverter 13. Therefore, excess power not supplied to the inverter 13 is used to charge the battery 30. When Ppv falls under Pra at the first time t1 due to a decrease in the amount of power generated by the power generation system 2, the converter 14 changes its operation mode from a charge mode to an off state. The converter 14 changes its operation mode from the off state to a discharge mode at a second time t2 at which Ppv falls under Prb. When the amount of power generated by the power generation system 2 varies between the first and second times t1 and t2 but is between Pra and Prb, i.e., within the off state section, the converter 14 maintains the off state therein.

Referring to FIG. 12, an upper graph illustrates an amount of power generated by the power generation system 2, and a lower graph illustrates an amount of power supplied into or supplied from the battery 30. A preset amount of power output from the inverter 13, i.e., rated power of the inverter 13, is set to Pro. An upper limit of an off state section in which the converter 14 is switched off is set to Pra, and a lower limit of the off state section is set to Prb. Ppv is lower than Prb before a first time t1, and this indicates that the power generation system 2 generates an amount of power that is less than an amount of power demanded by the inverter 13. Therefore, power corresponding to Pro-Ppv is supplied from the battery 30 to supplement Ppv. When Ppv rises above Prb at the first time t1 due to an increase in the amount of power generated by the power generation system 2, the converter 14 changes its operation mode from a discharge mode to an off state. The converter 14 changes its operation mode from the off state to a charge mode at a second time t2 at which Ppv rises above Pra. When the amount of power generated by the power generation system 2 varies between the first and second times t1 and t2 but is between Pra and Prb, i.e., within the off state section, the converter 14 maintains the off state therein.

In the embodiment of FIGS. 11 and 12, Pro is set to be in the middle of the off state section but is not limited thereto. For example, Pro may be set to be equal to Pra or Prb.

As described above, an amount of power output from the inverter 13 is set to Pro. Also, although the amount of power generated by the power generation system 2 is different from Pro, an off state section in which the converter 14 stops operating is set. Therefore, the converter 14 is prevented from excessively changing its operation mode, a lifespan of the converter 14 increases, and failure occurrences of the converter 14 decrease. Also, stability of the energy storage system 1 including the converter 14 is secured.

Third Embodiment

Figure 13:
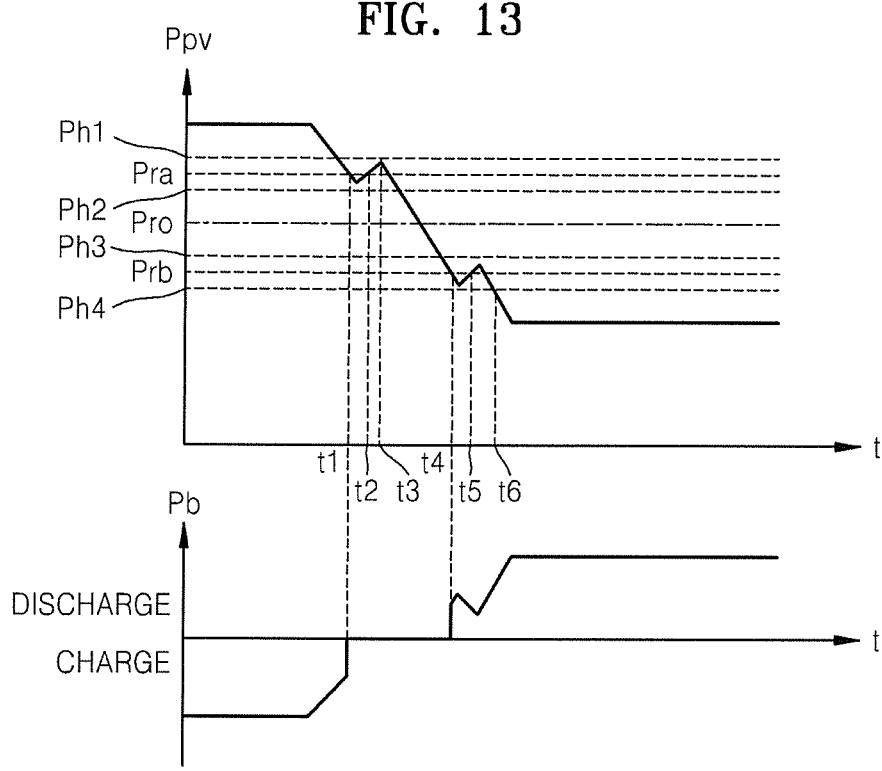
Figure 14:
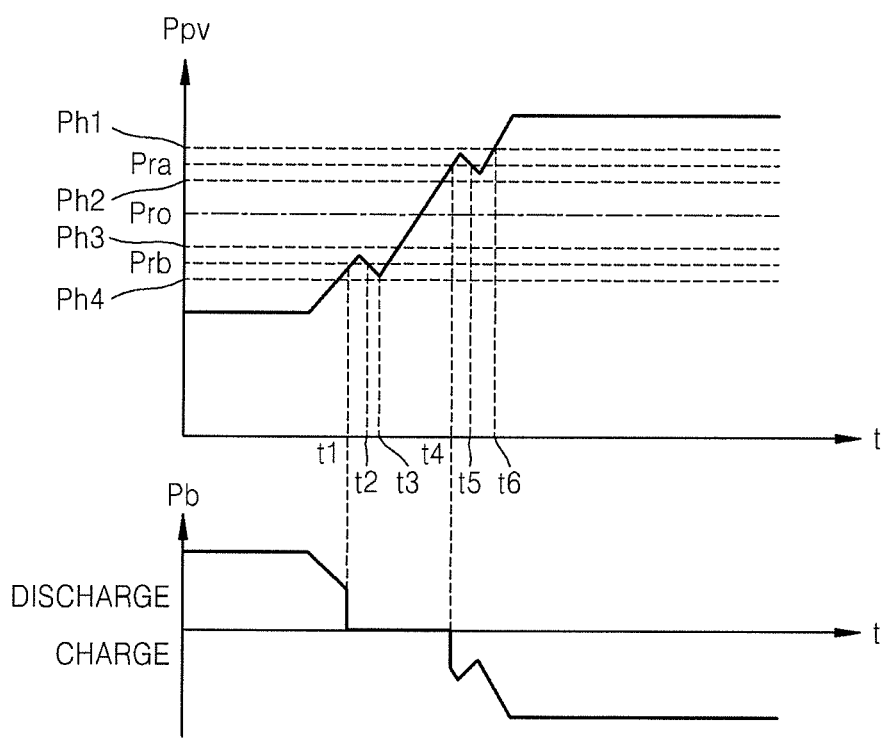

FIGS. 13 and 14 are graphs illustrating the operation mode of the converter 14 shown in FIG. 2, according to another embodiment of the present invention. A determination of the operation mode of the converter 14 is set as follows.

<Set Operation-3>

An off state section of the converter 14 is set.

A hysteresis section of the off state section is set.

Referring to FIG. 13, an upper graph illustrates an amount of power generated by the power generation system 2, and a lower graph illustrates an amount of power supplied into or supplied from the battery 30. As in the embodiment of FIG. 11, in the present embodiment, rated power of the inverter 13 is set to Pro, an upper limit of an off state section is set to Pra, and a lower limit of the off state section is set to Prb. Also, in the present embodiment, a hysteresis section is set to Ph1, Ph2, Ph3, and Ph4 with respect to Pra and Prb. The hysteresis section prevents an operation mode change of the converter 14 from frequently occurring, and its detailed description will be described below in more detail.

When Ppv is higher than Pra, that is, the upper limit of the off state section, before a first time t1, the converter 14 operates in a charge mode. Ppv falls under Pra at the first time t1 due to a decrease in the amount of power generated by the power generation system 2. When Ppv is within the off state section, the converter 14 changes its operation mode from the charge mode to an off state.

After Ppv falls under Pra, Ppv wobbles around Pra. Thus, although Ppv rises above Pra to some degree, the operation mode of the converter 14 does not change to the charge mode. This is to prevent the operation mode change of the converter 14 from frequently occurring, and its criterion is Ph1 herein. In other words, Ppv rises after the first time t1 and rises above Pra at a second time t2. However, when Ppv does not exceed Ph1 as at a third time t3, the converter 14 maintains the off state. However, if Ppv falls under Ph2 and then rises above Pra, the operation mode of the converter 14 changes from the off state to the charge mode.

When Ppv continuously decreases after the third time t3 and falls under Prb at a fourth time t4, and thus Ppv gets out of the off state section, the converter 14 changes its operation mode from the off state to a discharge mode.

Even if Ppv falls under Prb, wobbles around Prb, and rises above Prb to some degree, the converter 14 does not change its operation mode to the off state. This is to prevent the operation mode change of the converter 14 from frequently occurring, and its criterion is Ph3 herein. In other words, Ppv rises after the fourth time t4 and rises above Prb at a fifth time t5. However, if Ppv does not exceed Ph3, the converter 14 maintains the discharge mode. Therefore, the amount of power supplied into or supplied from the battery 30 varies with variations in Ppv. However, if Ppv falls under Ph4 at a sixth time t6 and then rises above Prb, the converter 14 changes its operation mode from the discharge mode to the off state.

Referring to FIG. 14, an upper graph illustrates an amount of power generated by the power generation system 2, and a lower graph illustrates an amount of power supplied into or supplied from the battery 30. As in the embodiment of FIG. 13, in the present embodiment, rated power of the inverter 13 is set to Pro, an upper limit of an off state section is set to Pra, and a lower limit of the off state section is set to Prb, and a hysteresis section is set to Ph1, Ph2, Ph3, and Ph4.

When Ppv is lower than Prb, which is the lower limit of the off state section, before a first time t1, the converter 14 operates in a discharge mode. Ppv rises above Prb at the first time t1 due to an increase in the amount of power generated by the power generation system 2. When Ppv is within the off state section, the converter 14 changes its operation mode from the discharge mode to an off state.

Even if Ppv rises above Prb, wobbles around Prb, and falls under Prb in some degrees, the converter 14 does not change its operation mode to the discharge mode. This is to prevent an operation mode change of the converter 14 from frequently occurring, and its criterion is Ph4 herein. In other words, Ppv decreases after the first time t1 and falls under Prb at a second time t2. However, if Ppv does not fall under Ph4 at a third time t3, the converter 14 maintains the off state. However, if Ppv rises above Ph3 and then falls under Prb, the converter 14 changes its operation mode from the off state to the discharge mode.

When Ppv continuously increases after the third time t3 and rises above Pra at a fourth time t4, and thus Ppv gets out of the off state section, the converter 14 changes its operation mode from the off state to a charge mode.

Even if Ppv rises above Pra, wobbles around Pra, and falls under Pra to some degrees, the converter 14 does not change its operation mode to the off state. This is to prevent the operation mode change of the converter 14 from frequently occurring, and its criterion is Ph2 herein. In other words, Ppv decreases after the fourth time t4 and falls under Pra at a fifth time t5. However, if Ppv does not fall under Ph2, the converter 14 maintains the charge mode. Therefore, the amount of power supplied into or supplied from the battery 30 varies with variations in Ppv. However, if Ppv rises above Ph1 at a sixth time t6 and then falls under Pra, the converter 14 changes its operation mode from the charge mode to the off state.

As described above, an amount of power output from the inverter 13 is set to Pro. Also, although an amount of power generated by the power generation system 2 is different from Pro, an off state section in which the converter 14 stops operating is set. Therefore, the converter 14 is prevented from excessively changing its operation mode, a lifespan of the converter 14 increases, and occurrences of failures of the converter 14 decrease. Also, stability of the energy storage system 1 including the converter 14 is secured. In addition, since a hysteresis section is set on boundaries of the off state section, frequent changes in the operation mode of the converter 14 occurring near the boundaries of the off state section are prevented.

The present invention has been described with reference to FIGS. 2 to 14, in which exemplary embodiments of the invention are shown. The invention, however, can be embodied in many different forms and should not be construed as being limited to the embodiments. For example, "Set Operation-1" and "Set Operation-3" may be combined.

In particular, if the amount of power generated by the power generation system 2 increases (or decreases) to enter into the off state section, the converter 14 changes its operation mode to the off state for a preset time. In this regard, even when the operation mode should be changed to its opposite operation mode after getting out of the off state section since the variation of the power generated by the power generation system 2 is too large, the converter 14 maintains its off state operation mode within the preset time. Then, after the preset time, the converter 14 operates in one of the charge mode, the discharge mode, and the off state by judging the amount of power generated by the power generation system 2. In other words, the conversion of the operation mode of the converter 14 may be determined by the time, the off state section, and the hysteresis section, concurrently (e.g., simultaneously).

Figure 15:
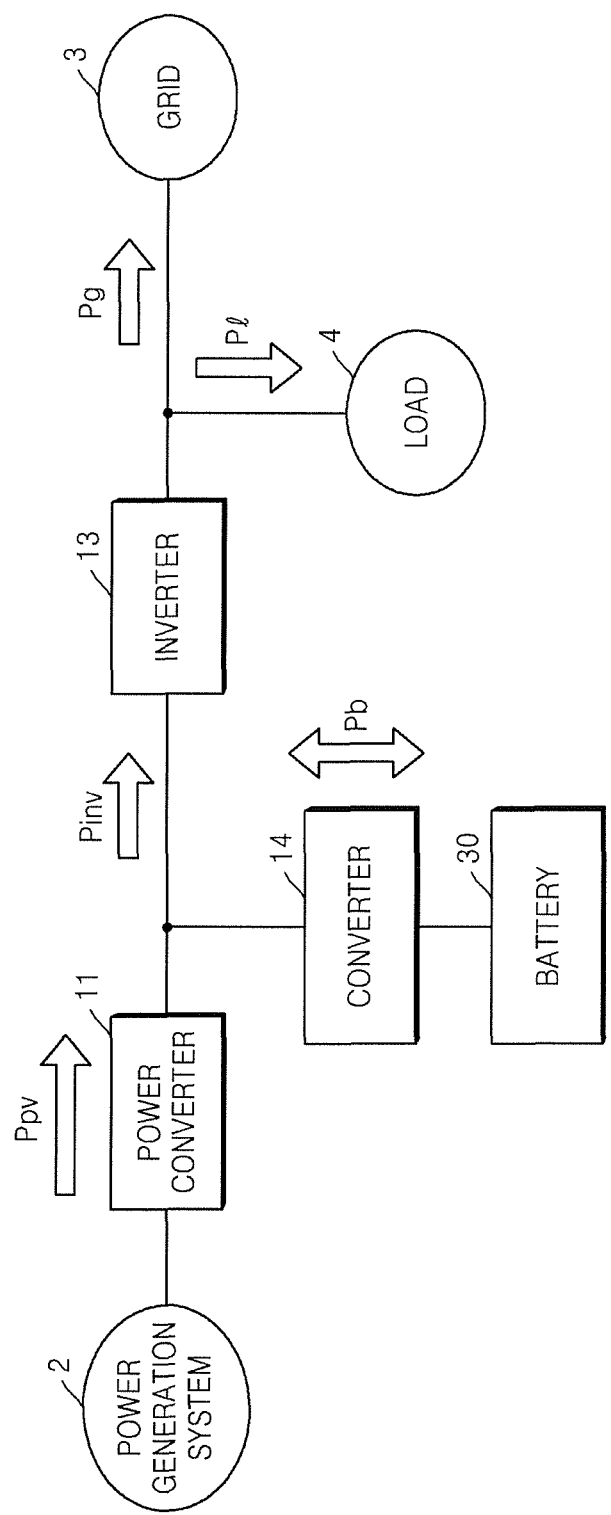
FIG. 15 is a block diagram illustrating an operation mode of an energy storage system according to another embodiment of the present invention.

FIG. 15 is a block diagram illustrating an operation method of an energy storage system 1 according to another embodiment of the present invention.

Referring to FIG. 15, the energy storage system 1 supplies a fixed amount of power to a grid 3, i.e., sells a fixed amount of power to the grid 3. Here, the amount of power supplied to the grid 3 is Pg, and an amount of power consumed by a load 4 is Pl. An amount of power output from a inverter 13 is substantially equal to an amount of power input into the inverter 13. Here, the amounts of power output from and input into the inverter 13 are denoted by Pinv. An amount of power generated by a power generation system 2 is denoted by Ppv, and an amount of power output from or supplied to a converter 14 is denoted by Pb. If the converter 14 supplies power to the inverter 13, Pb has a positive value. If power is supplied to the battery 30, Pb has a negative value. A relation among the amounts of power will be as expressed in Equation 2 below:

$$Pg = Pl - Pinv$$

$$Pinv = Ppv + Pb \qquad (2)$$

wherein the values of Pl and Ppv are not constant but constantly vary. Pb varies between being a positive value and being a negative value according to variations in the values of Pl and Ppv. In other words, the converter 14 frequently changes its operation mode between a charge mode and a discharge mode. Also, a battery 30 changes between being charged and being discharged. However, as described above, the frequent changes in the operation mode of the converter 14 shorten a lifespan of the converter 14 or make it more likely that a failure will occur in the converter 14. Also, the repetition of charge and discharge operations of the battery 30 has a harmful effect on a lifespan of the battery 30. Also, the above-described operations make the energy storage system 1 less stable and thus are not appropriate for the energy storage system 1. Therefore, in one embodiment, the operation of the converter 14 is preset according to the amount of power generated by the power generation system 2 and the amount of power consumed by the load 4 to solve the above-mentioned problems.

Fourth Embodiment

Figure 16:
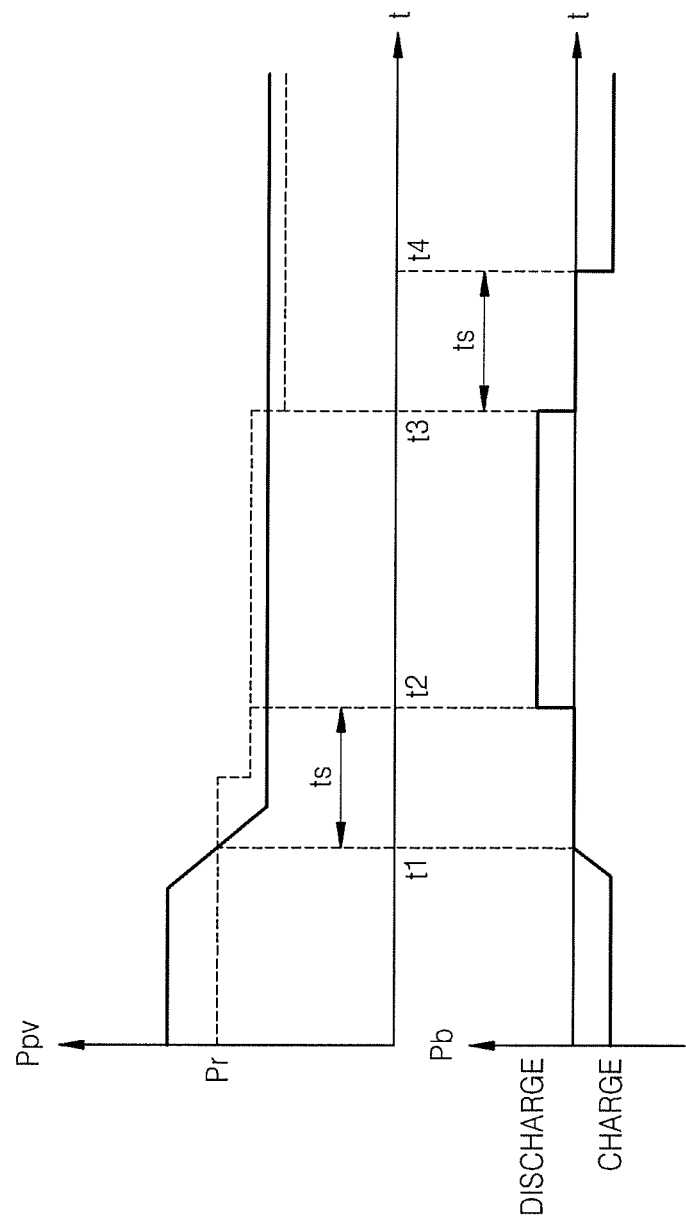
FIGS. 16 through 18 are graphs illustrating the operation modes of FIG. 15, according to other embodiments of the present invention.

FIG. 16 is a graph illustrating the operation mode of the converter 14 shown in FIG. 15, according to an embodiment of the present invention. A determination of the operation mode of the converter 14 is set as follows.

<Set Operation-4>

An operation of the converter 14 stops (changes to an off state) for a preset time after an operation mode change threshold point of the converter 14 occurs.

Referring to FIG. 16, an upper graph illustrates an amount of power generated by the power generation system 2, and a lower graph illustrates an amount of power supplied into or supplied from the battery 30. A preset amount of power output from the inverter 13, i.e., rated power of the inverter 13, is set to Pr. In the present embodiment, since Pg is set to be constant, Pr varies with Pl. In FIG. 16, Pr varies one time between first and second times t1 and t2 and then one more time at a third time t3.

Ppv is higher than Pr before the first time t1, and this indicates that the power generation system 2 generates an amount of power larger than an amount of power demanded by the inverter 13. Therefore, power corresponding to a part of Ppv exceeding Pr is used to charge the battery 30.

When Ppv falls under Pr at the first time t1 due to a decrease in the amount of power generated by the power generation system 2, the converter 14 stops operating for a preset time ts. In other words, the converter 14 changes from a charge mode to an off state. When the converter 14 is in the off state, the converter 14 does not change its operation mode due to variation in the value of Ppv. Thus, although Pr varies between the first and second times t1 and t2, this is not considered within the preset time ts.

After the preset time ts has elapsed, the converter 14 changes its operation mode to a discharge mode or the charge mode according to the value of Ppv. In FIG. 16, when Ppv remains lower than Pr after the preset time ts has elapsed, that is, at the second time t2, the converter 14 changes from the off state to the discharge mode.

When Ppv rises above Pr with a decrease in Pr at a third time t3, the converter 14 stops operating for the preset time ts. In other words, the converter 14 changes from the discharge mode to the off state. Also, since Ppv is higher than Pr after the preset time ts has elapsed, the converter 14 changes from the off state to the charge mode at a fourth time t4.

As described above, when the converter 14 operates around an operation mode change threshold value according to an amount of power generated by the power generation system 2 and an amount of power consumed by the load 4 and satisfies a condition for changing its operation mode, the converter 14 stops operating for the preset time ts. Therefore, the converter 14 is prevented from excessively changing its operation mode, a lifespan of the converter 14 increases, and occurrences of failures of the converter 14 decrease. Also, stability of the energy storage system 1 including the converter 14 is secured.

Fifth Embodiment

Figure 17:
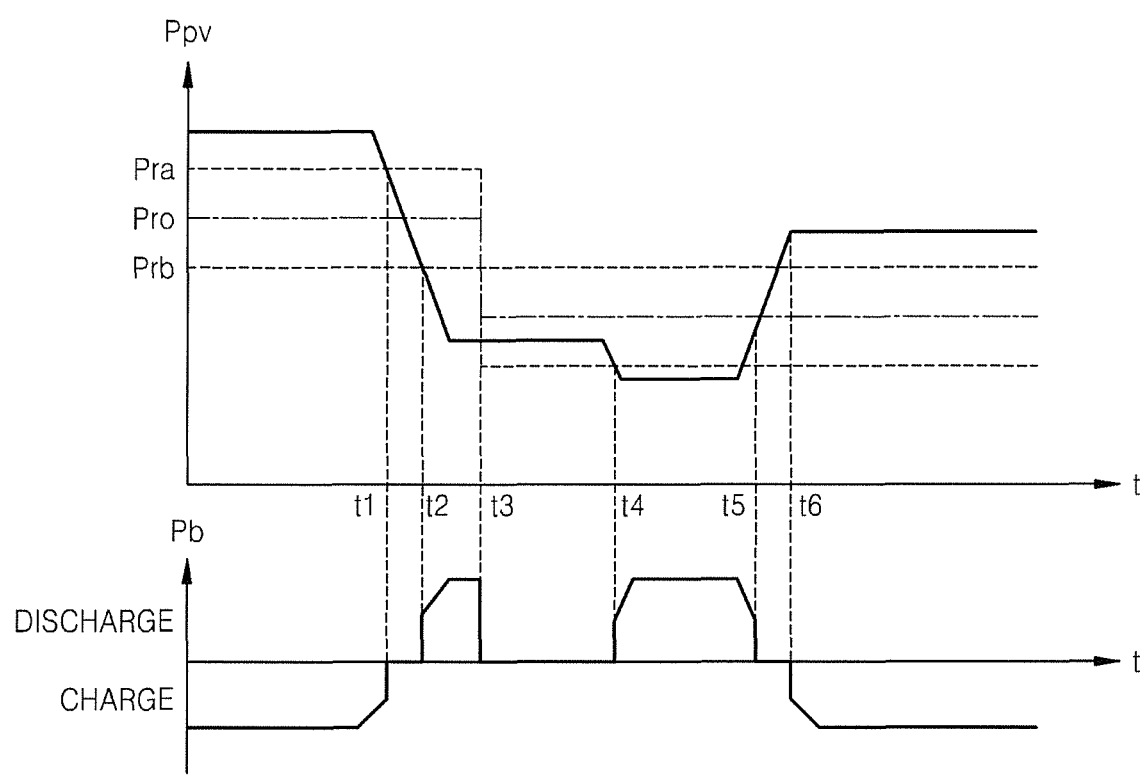

FIG. 17 is a graph illustrating the operation mode of the converter 14 shown in FIG. 15, according to another embodiment of the present invention. A determination of the operation mode of the converter 14 is set as follows.

<Set Operation-5>

An off state section of the converter 14 is set.

Referring to FIG. 17, an upper graph illustrates an amount of power generated by the power generation system 2, and a lower graph illustrates an amount of power supplied into or supplied from the battery 30. A preset amount of power output from the inverter 13, i.e., rated power of the inverter 13, is set to Pro. An upper limit of an off state section in which the converter 14 is switched off is set to Pra, and a lower limit of the off state section is set to Prb. An operation of the converter 14 of FIG. 17 is substantially the same as the operation of the converter 14 described with reference to FIGS. 11 and 12, and thus its detailed descriptions will be omitted herein. However, as described in the embodiment of FIG. 16, in the present embodiment, Pro varies with variations in Pl. Also, Pra and Prb belonging to the off state section vary with the variations in Pl. Therefore, the variations in Pra and Prb caused by the variations in Pl are to be considered along with variations in Ppv to change an operation mode of the converter 14.

As described above, when the converter 14 is to operate around an operation mode change threshold value according to an amount of power generated by the power generation system 2 and an amount of power consumed by the load 4, an off state section in which the converter 14 stops operating is set. Therefore, the converter 14 is prevented from excessively changing its operation mode, a lifespan of the converter 14 increases, and failure occurrences of the converter 14 decrease. Also, stability of the energy storage system 1 including the converter 14 is secured.

Sixth Embodiment

Figure 18:
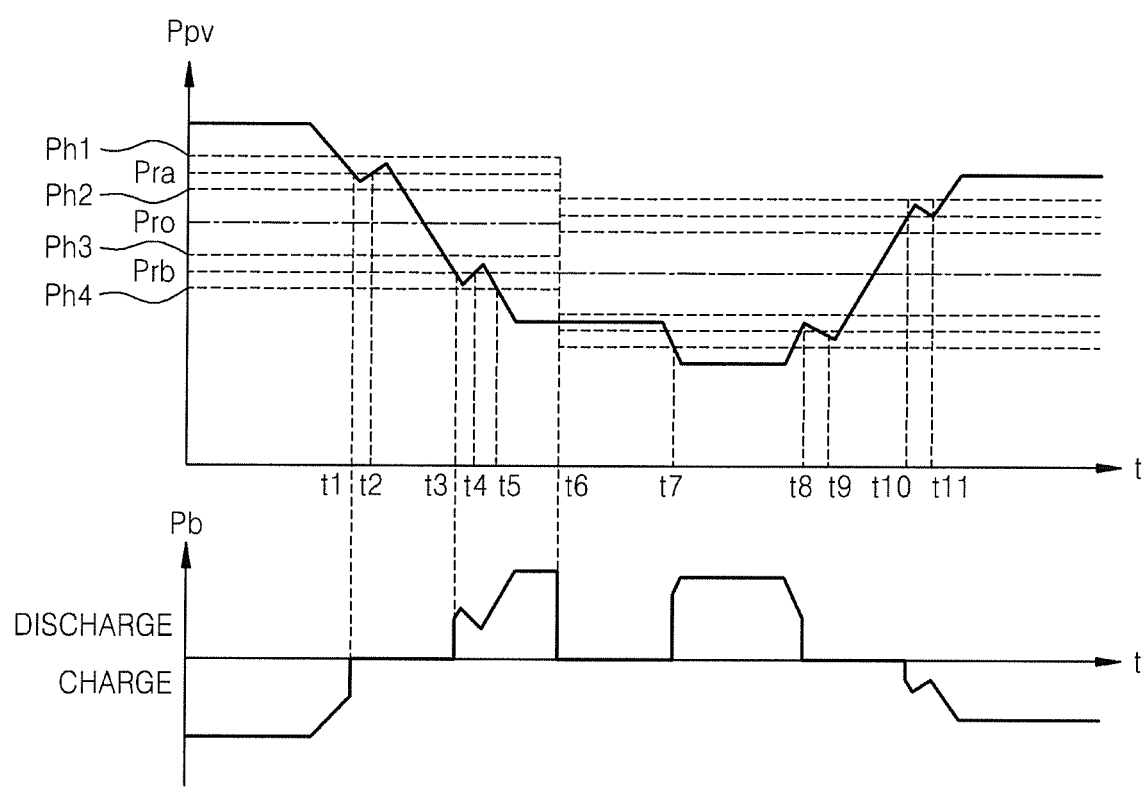

FIG. 18 is a graph illustrating the operation mode of the converter 14 shown in FIG. 15, according to another embodiment of the present invention. A determination of the operation mode of the converter 14 is set as follows.

<Set Operation-6>

An off state section of the converter 14 is set.

A hysteresis section of the off state section is set.

Referring to FIG. 18, an upper graph illustrates an amount of power generated by the power generation system 2, and a lower graph illustrates an amount of power supplied into or supplied from the battery 30. A preset amount of power output from the inverter 13, i.e., rated power of the inverter 13, is set to Pro. An upper limit of an off state section in which the converter 14 is switched off is set to Pra, a lower limit of the off state section is set to Prb, and a hysteresis section is set to Ph1, Ph2, Ph3, and Ph4 with respect to Pra and Prb. An operation of the converter 14 of FIG. 18 is substantially the same as the operation of the converter 14 described with reference to FIGS. 13 and 14, and thus its detailed description will be omitted herein. However, as in the embodiment of FIGS. 16 and 17, in the present embodiment, Pro varies with variations in Pl. Also, Pra and Prb belonging to the off state section and Ph1 through Ph4 belonging to the hysteresis section vary with the variations in Pl. Therefore, variations in Ppv and the variations in Pra, Prb, and Ph1 through Ph4 caused by the variations in Pl are to be considered to change an operation mode of the converter 14.

As described above, if the converter 14 is to operate around an operation mode change threshold value according to an amount of power generated by the power generation system 2 and an amount of power consumed by the load 4, an off state section in which the converter 14 stops operating is set. Therefore, the converter 14 is prevented from excessively changing its operation mode, a lifespan of the converter 14 increases, and failure occurrences of the converter 14 decrease. Also, stability of the energy storage system 1 including the converter 14 is secured. In addition, a hysteresis section is set on boundaries of the off state section to prevent the frequent change in the operation mode of the converter 14 occurring at or near the boundaries of the off state section.

The present invention has been described with reference to FIGS. 15 to 18, in which exemplary embodiments of the invention are shown. The invention, however, may be embodied in many different forms and should not be construed as being limited to the embodiments. For example, "Set Operation-4" and "Set Operation-6" may be combined.

In particular, when the amount of power generated by the power generation system 2 increases (or decreases) to enter into the off state section, the converter 14 changes its operation mode to the off state for a preset time. In this regard, even when the operation mode should be changed to its opposite operation mode after getting out of the off state section since the variation of the power generated by the power generation system 2 is too large, the converter 14 maintains its off state operation mode within the preset time. Then, after the preset time, the converter 14 operates in one of the charge mode, the discharge mode, and the off state by judging the amount of power generated by the power generation system 2. In other words, the conversion of the operation mode of the converter 14 may be determined by the time, the off state section, and the hysteresis section, concurrently (e.g., simultaneously).

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. An energy storage system comprising:
    a battery;
    an inverter for receiving a first power from an external source and generating a second power; and
    a converter coupled between the battery and both the external source and the inverter, the converter being configured to enter an off mode between a charge mode for charging the battery and a discharge mode for discharging the battery,
    wherein the converter is configured to enter the off mode for a set period of time when a difference between a value of the first power and a value of the second power changes polarity.

2. The energy storage system of claim 1, wherein, when the converter is in the off mode, the converter is configured to remain in the off mode for the set period of time regardless of variation of the difference between the value of the first power and the value of the second power.

3. The energy storage system of claim 1, wherein the converter is configured to operate in the discharge mode or the charge mode according to the difference between the value of the first power and the value of the second power, after the set period of time has elapsed.

4. The energy storage system of claim 1, wherein the second power varies in accordance with an amount of power consumed by a load coupled to the inverter.

5. An energy storage system comprising:
    a battery;
    an inverter for receiving a first power from an external source and generating a second power; and
    a converter coupled between the battery and both the external source and the inverter, the converter being configured to enter an off mode between a charge mode for charging the battery and a discharge mode for discharging the battery,
    wherein the converter is configured to enter the off mode when a value of the first power is between a first threshold value and a second threshold value that is lower than the first threshold value.

6. The energy storage system of claim 5, wherein a value of the second power is between the first threshold value and the second threshold value.

7. The energy storage system of claim 5, wherein the first threshold value and the second threshold value change by a same amount as the value of the second power.

8. The energy storage system of claim 5, wherein, when the converter is in the off mode, the converter is configured to remain in the off mode when variation of the value of the first power is between the first threshold value and the second threshold value.

9. The energy storage system of claim 5, wherein, when the converter is in the off mode, the converter is configured to exit the off mode when the value of the first power is above the first threshold value or below the second threshold value.

10. The energy storage system of claim 9, wherein, after the converter exits the off mode, the converter is configured to operate in the discharge mode or the charge mode according to the value of the first power and the first and second threshold values.

11. The energy storage system of claim 5, wherein
at least one of the first threshold value or the second threshold value is between an upper hysteresis value and a lower hysteresis value, and
the converter is configured to remain in the off mode while a variation of the value of the first power is between the upper hysteresis value and the lower hysteresis value.

12. The energy storage system of claim 5, wherein the second power varies in accordance with an amount of power consumed by a load coupled to the inverter.

13. A method of operating an energy storage system comprising a converter coupled between a battery and both an external source and an inverter, the method comprising:
converting a first power from the external source to a second power by the inverter;
operating the converter to enter an off mode between a charge mode for charging the battery and a discharge mode for discharging the battery;
discharging the battery by the converter when a value of the first power is less than a value of the second power and charging the battery by the converter when the value of the first power is greater than the value of the second power; and
operating the converter to enter the off mode for a set period of time when a difference between the value of the first power and the value of the second power changes polarity.

14. The method of claim 13, further comprising:
when the converter is in the off mode, maintaining the converter in the off mode regardless of variation of the difference between the value of the first power and the value of the second power.

15. The method of claim 13, further comprising:
after the set period of time has elapsed, operating the converter in the discharge mode or the charge mode according to the difference between the value of the first power and the value of the second power.

16. The method of claim 13, wherein the second power varies in accordance with an amount of power consumed by a load coupled to the inverter.

17. A method of operating an energy storage system comprising a converter coupled between a battery and both an external source and an inverter, the method comprising:
converting a first power from the external source to a second power by the inverter;
operating the converter to enter an off mode between a charge mode for charging the battery and a discharge mode for discharging the battery;
discharging the battery by the converter when a value of the first power is less than a value of the second power and charging the battery by the converter when the value of the first power is greater than the value of the second power; and
operating the converter to enter the off mode when the value of the first power is between a first threshold value and a second threshold value that is lower than the first threshold value.

18. The method of claim 17, wherein the first threshold value and the second threshold value change by a same amount as the value of the second power.

19. The method of claim 17, further comprising:
when the converter is in the off mode, maintaining the converter in the off mode when variation of the value of the first power is between the first threshold value and the second threshold value.

20. The method of claim 17, further comprising:
when the converter is in the off mode, operating the converter to exit the off mode when the value of the first power is above the first threshold value or when the value of the first power is below the second threshold value.

21. The method of claim 20, further comprising:
after the converter exits the off mode, operating the converter in the discharge mode or the charge mode according to the value of the first power and the first and second threshold values.

22. The method of claim 17, wherein
at least one of the first threshold value or the second threshold value is between an upper hysteresis value and a lower hysteresis value, and
the method further comprising:
maintaining the converter in the off mode while variation of the value of the first power is between the upper hysteresis value and the lower hysteresis value.

23. The method of claim 17, wherein the second power varies in accordance with an amount of power consumed by a load coupled to the inverter.

* * * * *